3,098,101
PREPARATION OF OXYGENATED COMPOUNDS
Clyde Lee Aldridge, Baton Rouge, and Neville Leverne Cull, Baker, La., assignors to Esso Research and Engineering Company, a corporation of Delaware
Filed Aug. 21, 1958, Ser. No. 756,430
13 Claims. (Cl. 260—604)

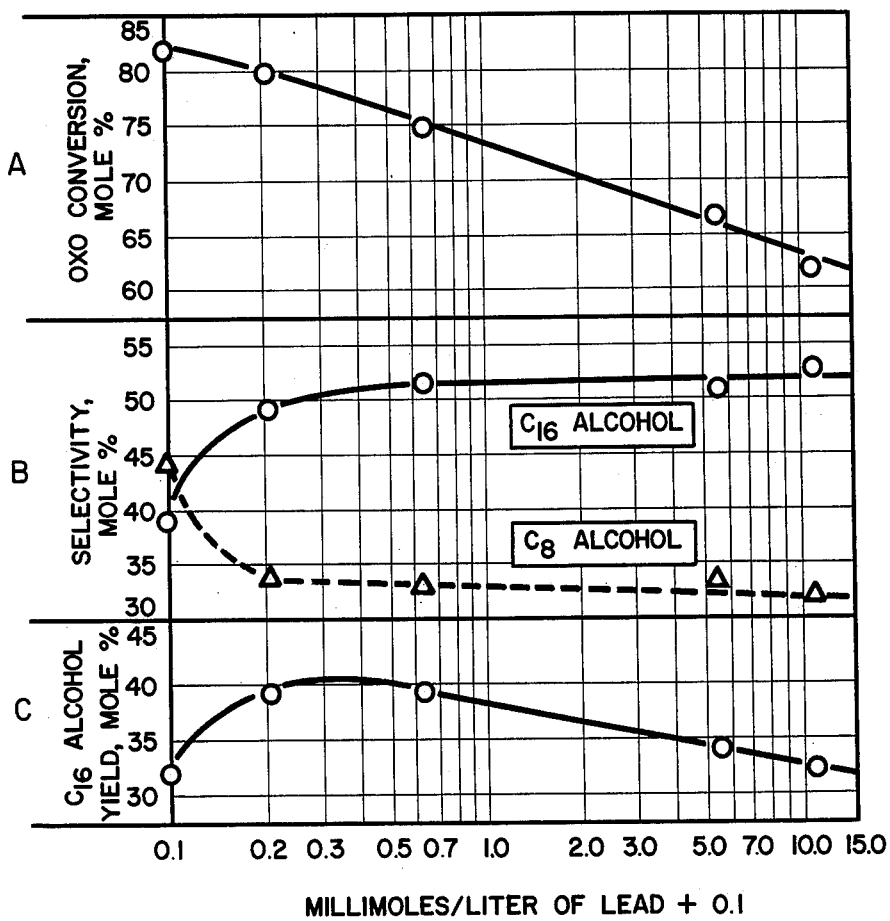

This invention relates to an improvement in the oxo process. More particularly, this invention relates to the use of a novel three-component catalyst system in a conventional oxo process to effect the production of exceptionally high yields of dimeric product.

The conventional oxo process wherein an olefin having $n$ carbon atoms is converted into an aldehyde having $n+1$ carbon atoms and then to the corresponding alcohol having $n+1$ carbon atoms has been in commercial use for a number of years. More recently, however, it has been discovered that the addition of a second component to the usual cobalt containing catalyst permits the production of dimeric product in high yields. For example, as shown in U.S. patent to Mason 2,811,567, heptene may be reacted with hydrogen and carbon monoxide at a ratio of .5 to 2 vols. of hydrogen per volume of carbon monoxide, at a temperature in the range of 250° to 450° F. and at a pressure of 1500 to 4000 p.s.i.g. in the presence of from .5 to 5% cobalt catalyst and from .05 to 0.5% zinc containing modifier to obtain a mixture of the $C_8$ aldehyde and alcohol and high yields of $C_{16}$ aldehyde and alcohol in the initial oxo stage. The oxo product may then be hydrogenated to reduce the aldehydes to the corresponding alcohol. By resort to this cobalt-zinc containing catalyst system, relatively high yields of the dimeric alcohol product may be obtained. Other modifiers include magnesium, barium, strontium, cadmium, calcium and beryllium.

It is an object of this invention to further improve the dimeric product yield in the oxo process. It is a further object of this invention to provide a novel three component catalyst system for the oxo process to effect these increased dimeric product yields. Insofar as this invention is concerned, it is of little consequence whether the dimeric product is recovered from the oxo stage in the form of an aldehyde mixture or after hydrogenation as dimeric alcohol.

Although the general oxo reaction conditions are well known in the art, for the purpose of completing the present disclosure, typical feeds applicable and the conditions employable in this process will be set forth below.

As feed for this process, any compound having an olefinic linkage is suitable. In particular, olefins either straight or branched chain from $C_2$ through $C_{20}$ are amenable to this process. This invention, however, will find its greatest applicability for use with the intermediate olefins such as butene, pentene, hexene, heptene, octene, nonene and decene.

It is to be remembered, that aside from the dimeric product obtainable from these feeds, there will also be obtained substantial yields of the monomeric product. For example, heptene as a reactant will produce in accordance with this invention high yields of $C_{16}$ alcohol and substantial yields of $C_8$ or iso-octyl alcohol. The olefin feed as in the conventional oxo process may have the olefinic linkage on the terminal carbon atom or internally in the molecule. Substituted olefinic compounds are, of course, suitable and these would include such compounds as unsaturated acids, alcohols and the like. Cyclic olefins are also important oxo feed stocks. For a more complete description of the oxo process, reference may be had to the book entitled "Higher Oxo Alcohols" by Dr. Lewis F. Hatch and published by Enjay Co., Inc., New York, N.Y.

The catalyst in accordance with this invention for the oxo stage will comprise as the first component in the three component system from 0.005 to 0.2 mole of cobalt compounds per liter of olefin feed. The cobalt may be employed in any form including its elemental state. Preferably, however, cobalt salts of organic acids such as cobalt oleate, stearate, naphthenate and the like are employed since they may be solubilized in the olefin feed if desired. Other cobalt salts such as cobalt formate, acetate and butyrate, as well as inorganic salts such as cobalt chloride, nitrate, oxide and the like are also suitable. Preformed cobalt carbonyl or hydrocarbonyl is an exceptionally good catalyst for the reaction and may be employed if desired.

The second component of the present catalyst system is an oxo modifier which comprises a compound of a Group II metal including zinc, magnesium, barium, cadmium, strontium, calcium and beryllium. The most preferred modifiers for the present invention are the zinc and magnesium compounds which may take the form of any of the compounds noted above for cobalt. The anion of the modifier is not critical since it is the element itself which is catalytically active for the purpose of modifying the reaction and in fact elemental modifiers may be employed if desired. These modifiers may be employed in an amount substantially equivalent to the cobalt catalyst, i.e. 0.005 to 0.2 mole of modifier per liter of olefin feed. The oil soluble salts of these modifier metals are preferred.

The third component of the catalyst system, which will be termed herein the activator, will comprise lead, mercury, bismuth or thallium in any form such as those recited above for cobalt, e.g. lead stearate, naphthenate, linoleate, oleate, acetate, butyrate, chloride, nitrate, oxide, etc. These metal activators are all in the sixth period of the Periodic Chart and have atomic numbers of 80–83 inclusive. The oxo reaction, however, is extremely sensitive to these activators and care must be taken to provide this activator in an amount within a critical range. The activator must necessarily be added in from almost trace amounts, e.g. 0.05 millimole per liter of olefin, to amounts not exceeding about 10 millimoles of activator per liter of olefin feed. It is to be understood that the three components may be added separately to the reaction zone or in any combination desired. In a commercial operation it may be preferable to dissolve all three components in the olefin feed.

Temperatures within the oxo reactor may range between about 200° F. to 500° F. depending on the molecular weight of the feed employed. The higher molecular weight feeds, e.g. dodecene, generally require more severe operating conditions than lower molecular weight feeds such as ethylene, propylene and butylene. The pressures may range between about 1000 p.s.i.g. to about 6000 p.s.i.g.

It is to be understood that this initial oxo reaction may be carried out in batch operation or in a continuous process. In most commercial operations a continuous process would be elected to produce the desired oxygenated products most economically.

such as carriers, other activators and modifiers which may be employed to increase conversion, yield, selectivity or to permit lower operating temperatures and pressures.

TABLE I

*Effect of Modifiers on the Oxo Reaction*

| Run No. | 1 (blank) | 2 [a] | 3 | 4 | 5 | 6 | 7 [b] | 8 | 9 |
|---|---|---|---|---|---|---|---|---|---|
| Cobalt oleate, moles/liter olefin | .033 | .033 | .033 | .033 | .033 | .033 | .033 | .033 | .033. |
| Modifier | None | $Zn(St)_2$ [c] | $Zn(St)_2$ | $Zn(St)_2$ | $Zn(St)_2$ | $Zn(St)_2$ | $Zn(St)_2$ | $Zn(St)_2$ | $Zn(St)_2$. |
| Modifier, m./l. olefin | | .022 | .022 | .022 | .022 | .022 | .022 | .022 | .022 |
| Activator | None | None | Bioleate [d] | Bioleate [d] | $Hg(St)_2$ | $Hg(St)_2$ | $Pb(Ol)_2$ | $Pb(St)_2$ | $Pb(St)_2$. |
| Activator, moles/liter olefin | | | .00025 | .0025 | .00055 | .0055 | .00055 | .0011 | .0022. |
| Selectivities, mole percent: | | | | | | | | | |
| $C_8$ alcohol | 78.4 | 45 | 36.6 | 35.9 | 36.0 | 37.5 | 31.3 | 32.4 | 31.4. |
| Intermediate | 8.2 | 5 app | 3.6 | 3.7 | 4.5 | 4.5 | 3.8 | 3.7 | 4.4. |
| $C_{16}$ alcohol | 4.6 | 38 | 48.7 | 48.7 | 45.8 | 49.1 | 54.6 | 52.7 | 52.5. |
| Bottoms | 8.8 | 12 app | 11.1 | 11.7 | 13.7 | 8.9 | 10.3 | 11.0 | 11.7. |
| Conditions, oxo: | | | | | | | | | |
| Temperature, °F | 350 | 350 | 350 | 350 | 350 | 350 | 350 | 350 | 350. |
| Pressures, p.s.i.g | 3,000 | 3,000 | 3,000 | 3,000 | 3,000 | 3,000 | 3,000 | 3,000 | 3,000. |
| Time, hours | 6 | 6 | 6 | 6 | 6 | 6 | 6 | 6 | 6. |
| Demetaling: | | | | | | | | | |
| Temperature, °F | 350 | 350 | 350 | 350 | 350 | 350 | 350 | 350 | 350. |
| Hydrogen pressure, p.s.i.g. at room temp. | 500 | 500 | 500 | 500 | 500 | 5000 | 500 | 500 | 500. |
| Time, hours | 2 | 2 | 2 | 2 | 2 | 2 | 2 | 2 | 2. |
| Hydrogenation: | | | | | | | | | |
| Temperature, °F | 350 | 350 | 350 | 350 | 350 | 350 | 350 | 350 | 350. |
| Pressure, p.s.i.g | 3,000 | 3,000 | 3,000 | 3,000 | 3,000 | 3,000 | 3,000 | 3,000 | 3,000. |
| Time, hours | 6 | 6 | 6 | 6 | 6 | 6 | 6 | 6 | 6. |
| Catalyst | (e) | (e) | (e) | (e) | (e) | (e) | (e) | (e) | (e). |

[a] Average of 8 runs. [b] Average of 4 runs. [c] Zinc stearate. [d] Bismuth oleate. [e] Nickel on kieselguhr, 12 vol. percent.

The product mixture from the oxo stage will comprise both aldehyde and alcohol, the ratio of aldehyde to alcohol depending in part on the severity of conditions and catalyst system employed. Aldehyde products may be recovered from the oxo stage reaction mixture and purified. For example, in accordance with this invention an olefin feed containing $n$ carbon atoms per molecule produces in the oxo stage a crude product containing an aldehyde having $n+1$ carbon atoms and an aldehyde containing $2n+2$ carbon atoms. Some of the aldehydes are hydrogenated during oxonation resulting in the corresponding alcohols. To convert all of the aldehydes to alcohols, the crude oxo product is hydrogenated after first removing metal contaminants. The contaminants, which will includes metal compounds corresponding to the components of the catalyst employed, may be removed by any conventional demetaling technique. These techniques are well known in the art; however, a particularly preferred process comprises treating the crude aldehyde mixture at elevated temperatures of from about 200° to 500° F. with steam and water for several hours at a pressure in the range of 300 to 2000 p.s.i.g. Hydrogen or other inert gases may be employed to aid in the stripping of the contaminants from the crude aldehyde mixture. Other techniques comprise the use of an acid to form metal salts or the use of a chelating agent to absorb the metal ions. The particular demetaling process employed insofar as this invention is concerned is one of choice.

After demetaling the aldehyde mixture, hydrogenation may be carried out at a temperature between 200° and 500° F. and a hydrogen pressure between 1000 to 5000 p.s.i.g. for several hours in the presence of any conventional hydrogenation catalyst such as nickel, cobalt molybdate, molybdenum sulfide, tungsten, sulfide and the like. A tower packed with the catalyst is a particularly preferred technique. Hydrogenation of oxo aldehydes is also well known in the art and any conventional process may be employed. It is again emphasized that the general oxo, demetaling and hydrogenation stages are all conventional save for the use of the novel three-component catalyst system of this invention. To demonstrate the effectiveness of the novel catalyst system employed herein, reference may be had to the following table which compares numerous runs employing cobalt catalysis, cobalt-zinc catalysis, cobalt-magnesium catalysis and the three-component catalyst system of this invention. This invention does not exclude the use of added components To best demonstrate the criticality with regard to the proportions of the activator component, reference is now had to the drawing which shows in graph form the results of a series of runs, some of which are shown in Table I. The graph is divided into three sections and plots millimoles of lead $+0.1$ against (A) overall conversion, (B) selectivity of dimer and monomer product and (C) $C_{16}$ alcohol yield mole percent. As seen from sections B and C of the graph and as shown in the previous table, very minor amounts of the third component, e.g. 0.1 millimole, are sufficient to markedly increase the dimer alcohol yield and selectivity. On the other hand, as noted from section A of the graph, accompanying the increase in $C_{16}$ yield a relatively uniform decrease in overall oxo conversion is effected. The amount of dimer alcohol yield is, however, significantly superior when the third component is employed over a range of from trace amounts to about 10 millimoles of the activator. At about 10 millimoles of activator there is only a slight increase in overall dimer alcohol yield over a two component catalyst system and this slight increase is offset by the relatively low conversion as evidenced from section A of the graph.

As noted from the above comparative data, cobalt catalysis produces little dimer alcohol, i.e. 4.6 mole percent selectivity. Employing the prior art zinc modifier in combination with cobalt catalyst, as evidenced by Run 2, the $C_{16}$ alcohol selectivity is raised to about 38 mole percent. The remaining runs in Table I show the effect of bismuth, mercury and lead activators when combined with cobalt and zinc. It is to be noted that employing only .25 millimole of bismuth oleate raises the mole selectivity to 48.7 percent with no substantial further increase noted when employing 2.5 millimoles of this activator. Mercury as an activator, as evidenced by Runs 5 and 6, also shows a substantial increase at .55 millimole mercury and a further increase at 5.5 millimoles concentration, all based on a liter of olefin feed. Runs 7, 8 and 9 show the effect of a cobalt-zinc-lead tri-catalyst system varying the concentrations of lead activator. The lowest concentration of lead shown, i.e. .55 millimoles per liter raises the selectivity of $C_{16}$ alcohol to 54.6 mole percent, and higher concentrations of lead, as shown in Runs 8 and 9, apparently do not effect an additional increase in the selectivity to dimer alcohol.

The following table shows a series of experiments carried out under the same conditions as specified for the runs in Table I with exception of the modifiers and activators.

TABLE II

| Run No. | 10 | 11 | 12 | 13 | 14 | 15 | 16 |
|---|---|---|---|---|---|---|---|
| Cobalt oleate, moles/liter olefin | .033 | .033 | .033 | .033 | .033 | .033 | .033. |
| Modifier | None | None | $Mg(St)_2$ [a] | $Mg(St)_2$ | $Mg(St)_2$ | $Mg(St)_2$ | $Mg(Ol)_2$. |
| Modifier, m./l. olefin |  |  | .022 | .022 | .022 | .022 | .022. |
| Activator | None | $Pb(St)_2$ |  | $Pb(St)_2$ | $Pb(St)_2$ |  | $Bi(Ol)_3$. |
| Activator, m./l. olefin |  | .0055 |  | .00055 | .0055 |  | .0025. |
| Selectivities, mole percent: |  |  |  |  |  |  |  |
| $C_8$ alcohol | 78.4 | 69.8 | 68.2 | 64.1 | 40.1 | 67.2 | 64.4. |
| Intermediate | 8.2 | 5.8 | 6.0 | 7.3 | 5.2 | 6.2 | 5.7. |
| $C_{16}$ alcohol | 4.6 | 12.9 | 19.8 | 23.5 | 48.8 | 19.7 | 22.6. |
| Bottoms | 8.8 | 11.5 | 6.0 | 5.1 | 5.9 | 6.9 | 7.4. |
| Conditions, oxo: |  |  |  |  |  |  |  |
| Temperature, °F | 350 | 350 | 350 | 350 | 350 | 350 | 350. |
| Pressures, p.s.i.g | 3,000 | 3,000 | 3,000 | 3,000 | 3,000 | 3,000 | 3,000. |
| Time, hours | 6 | 6 | 6 | 6 | 6 | 6 | 6. |
| Demetaling: |  |  |  |  |  |  |  |
| Temperature, °F | 350 | 350 | 350 | 350 | 350 | 350 | 350. |
| Hydrogen pressure, p.s.i.g. at room temp. | 500 | 500 | 500 | 500 | 500 | 500 | 500. |
| Time, hours | 2 | 2 | 2 | 2 | 2 | 2 | 2. |
| Hydrogenation: |  |  |  |  |  |  |  |
| Temperature, °F | 350 | 350 | 350 | 350 | 350 | 350 | 350. |
| Pressure, p.s.i.g | 3,000 | 3,000 | 3,000 | 3,000 | 3,000 | 3,000 | 3,000. |
| Time, hours | 6 | 6 | 6 | 6 | 6 | 6 | 6. |
| Catalyst | (c) | (c) | (c) | (c) | (c) | (c) | (c). |

[a] St = Stearate.   [b] Ol = Oleate.   [c] Nickel on kieselguhr, 12 vol. percent.

Run 10 is in fact Run 1 and is repeated in Table II for ease of comparison. Run 11 shows the effect of lead alone without the modifier, whereby a moderate increase in dimer alcohol selectivity is noted. Similarly, the use of magnesium in Run 12 shows a moderate increase in dimer alcohol selectivity. Runs 13 and 14, which combine cobalt, magnesium and lead components, show that lead at .5 millimole per liter concentration effects a further moderate increase; however, increasing the concentration to 5.5 millimoles per liter effects a selectivity comparable with that obtained by the cobalt-zinc-lead tri-catalyst system. Run 15 confirms the results of Run 12 employing a different magnesium modifier, and Run 16 shows a moderate increase in selectivity to the dimeric product employing a cobalt-magnesium-bismuth tri-catalyst system.

The following table shows runs comparing a cobalt-strontium-lead tri-catalyst system with cobalt-strontium and cobalt systems.

TABLE III

| Run No. | 17 | 18 | 19 |
|---|---|---|---|
| Cobalt oleate moles/liter olefin | .033 | .033 | .033. |
| Modifier | None | $Sr(St)_2$ [a] | $Sr(St)_2$. |
| Modifier, m./l. olefin |  | .022 | .022. |
| Activator | None |  | $Pb(St)_2$. |
| Activator, m./l. olefin |  |  | .0055. |
| Selectivities, mole percent: |  |  |  |
| $C_8$ alcohol | 78.4 | 72.1 | 66.2. |
| Intermediate | 8.2 | 6.3 | 6.8. |
| $C_{16}$ alcohol | 4.6 | 13.8 | 19.8. |
| Bottoms | 8.8 | 7.8 | 7.2. |
| Conditions, oxo: |  |  |  |
| Temperature, °F | 350 | 350 | 350. |
| Pressures, p.s.i.g | 3,000 | 3,000 | 3,000. |
| Time, hours | 6 | 6 | 6. |
| Demetaling: |  |  |  |
| Temperature, °F | 350 | 350 | 350. |
| Hydrogen pressure, p.s.i.g. at room temp. | 500 | 500 | 500. |
| Time, hours | 2 | 2 | 2. |
| Hydrogenation: |  |  |  |
| Temperature, °F | 350 | 350 | 350. |
| Pressure, p.s.i.g | 3,000 | 3,000 | 3,000. |
| Time, hours | 6 | 6 | 6. |
| Catalyst | (b) | (b) | (b). |

[a] St=Stearate.   [b] Nickel on kieselguhr, 12 vol. percent.

Run 17 is in fact Run 1 of Table I. Run 18 shows a moderate increase in selectivity with strontium, and Run 19 shows a further increase in the selectivities to dimer alcohol in the cobalt-strontium-lead tri-catalyst system.

What is claimed is:

1. A process for converting an olefinic hydrocarbon having $n$ carbon atoms in the molecule, $n$ being an integer ranging from 2 to 20, into an aldehyde having $2n+2$ carbon atoms per molecule which comprises reacting said olefinic hydrocarbon at elevated temperatures and pressures with hydrogen and carbon monoxide in a carbonylation zone in the presence of: a cobalt carbonylation catalyst, as a reaction modifier an oil soluble compound of a metal selected from the group consisting of zinc, magnesium, barium, cadmium, strontium, calcium and beryllium, and as an activator an olefin soluble salt of a metal having an atomic number between 80 and 83 inclusive, said activator being present in an amount of from 0.1 to 10 millimoles per liter of olefinic hydrocarbon.

2. A process in accordance with claim 1 wherein said reaction modifier is a zinc compound.

3. A method in accordance with claim 1 wherein said activator is a lead compound.

4. A method in accordance with claim 1 wherein said activator is a mercury compound.

5. A method in accordance with claim 1 wherein said activator is a bismuth compound.

6. A process for preparing high molecular weight oxygenated compounds selected from the class consisting of aldehydes and alcohols having $2n+2$ carbon atoms per molecule and mixtures comprising same from an olefinic hydrocarbon feed having $n$ carbon atoms per molecule, $n$ being an integer ranging from 2 to 20, which comprises reacting said olefinic feed with carbon monoxide and hydrogen at elevated temperatures and pressures in the presence of a cobalt carbonylation catalyst in an amount from 0.005 to 0.2 moles per liter, an oil soluble zinc salt of a fatty acid reaction modifier in an amount of from 0.005 to 0.2 moles per liter of olefinic feed and as an activator an olefin soluble salt of a metal having an atomic number between 80 and 83 inclusive in an amount from 0.1 to 10 millimoles per liter of olefinic feed.

7. A method in accordance with claim 6 wherein said activator is a lead compound.

8. A method in accordance with claim 6 wherein said activator is a mercury compound.

9. A method in accordance with claim 6 wherein said activator is a bismuth compound.

10. A process for preparing oxygenated compounds selected from the group consisting of aldehydes and alcohols and mixtures thereof which comprises reacting an olefin containing 2–20 carbon atoms with carbon monoxide and hydrogen at a temperature between 200–500° F. and at a pressure between 1000 and 6000 p.s.i.g. in the presence of a cobalt carbonylation catalyst in an amount from 0.005 to 0.2 mole per liter of olefin, an oil soluble zinc salt in an amount of from 0.005 to 0.2 moles per liter of olefin and as an activator an olefin soluble salt of a metal having an atomic number between 80 and 83 inclusive in an amount from 0.1 to 10 millimoles per liter of olefin feed, said cobalt carbonylation catalyst, zinc salt and activator salt each being added to the process in the form of a salt of an acid selected from the group consisting of naphthenic acid and higher fatty acids, said reaction being carried out for a time sufficient to convert said olefin feed to an oxygenated product mixture containing aldehydic compounds having two more than twice the number of carbon atoms in said olefin feed.

11. A method in accordance with claim 10 wherein said activator is a lead compound.

12. A method in accordance with claim 10 wherein said activator is a mercury compound.

13. A method in accordance with claim 10 wherein said activator is a bismuth compound.

References Cited in the file of this patent

UNITED STATES PATENTS

| | | |
|---|---|---|
| 2,576,113 | Hagemeyer | Nov. 27, 1951 |
| 2,811,567 | Mason | Oct. 29, 1957 |